March 9, 1954  C. C. GINSBURG  2,671,677
DEVICE FOR CASTING SECRET BALLOTS
Filed Dec. 14, 1951  3 Sheets-Sheet 1
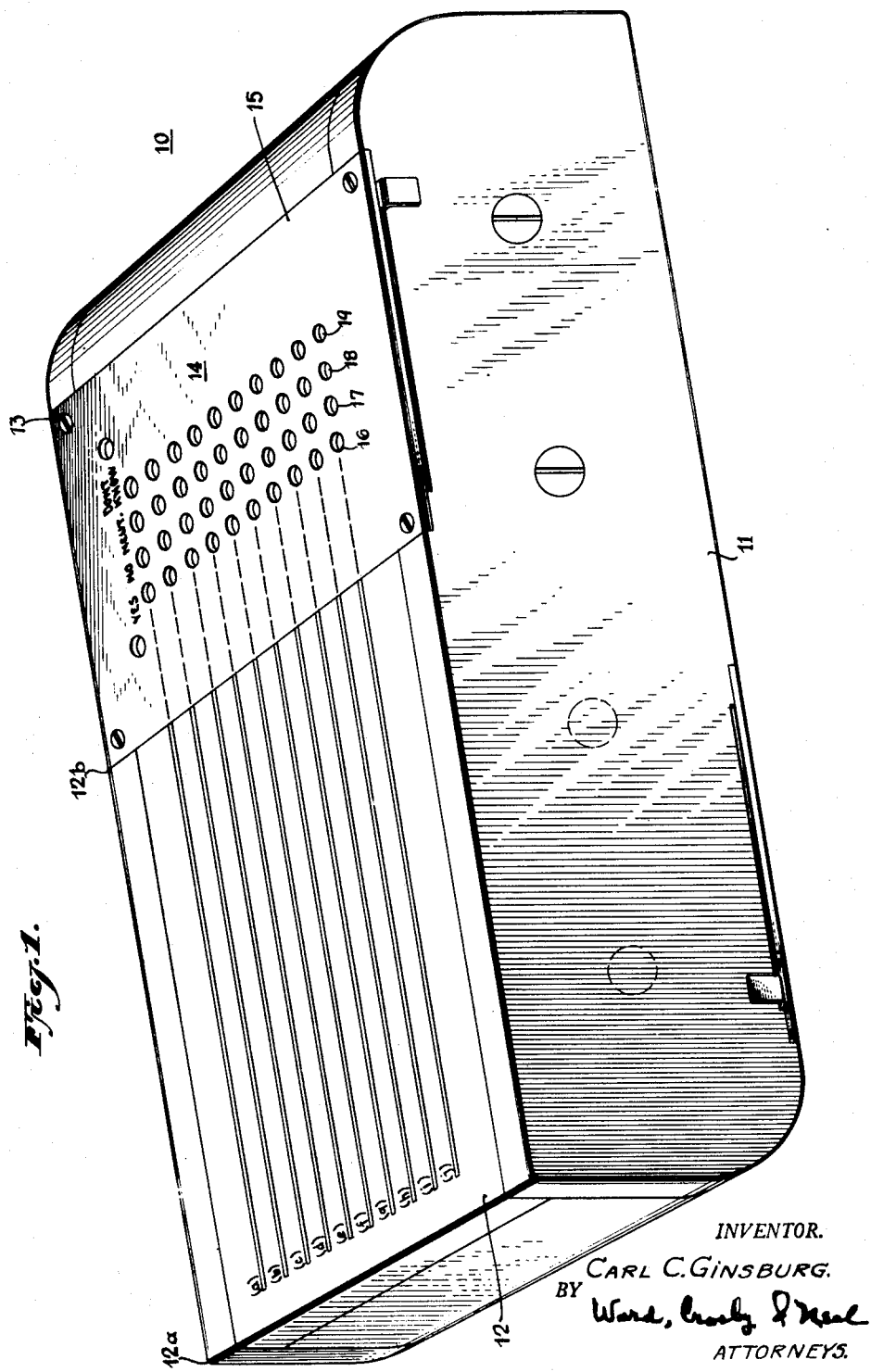
INVENTOR.
CARL C. GINSBURG.
BY Ward, Crosby & Neal
ATTORNEYS.

March 9, 1954   C. C. GINSBURG   2,671,677
DEVICE FOR CASTING SECRET BALLOTS
Filed Dec. 14, 1951   3 Sheets-Sheet 2
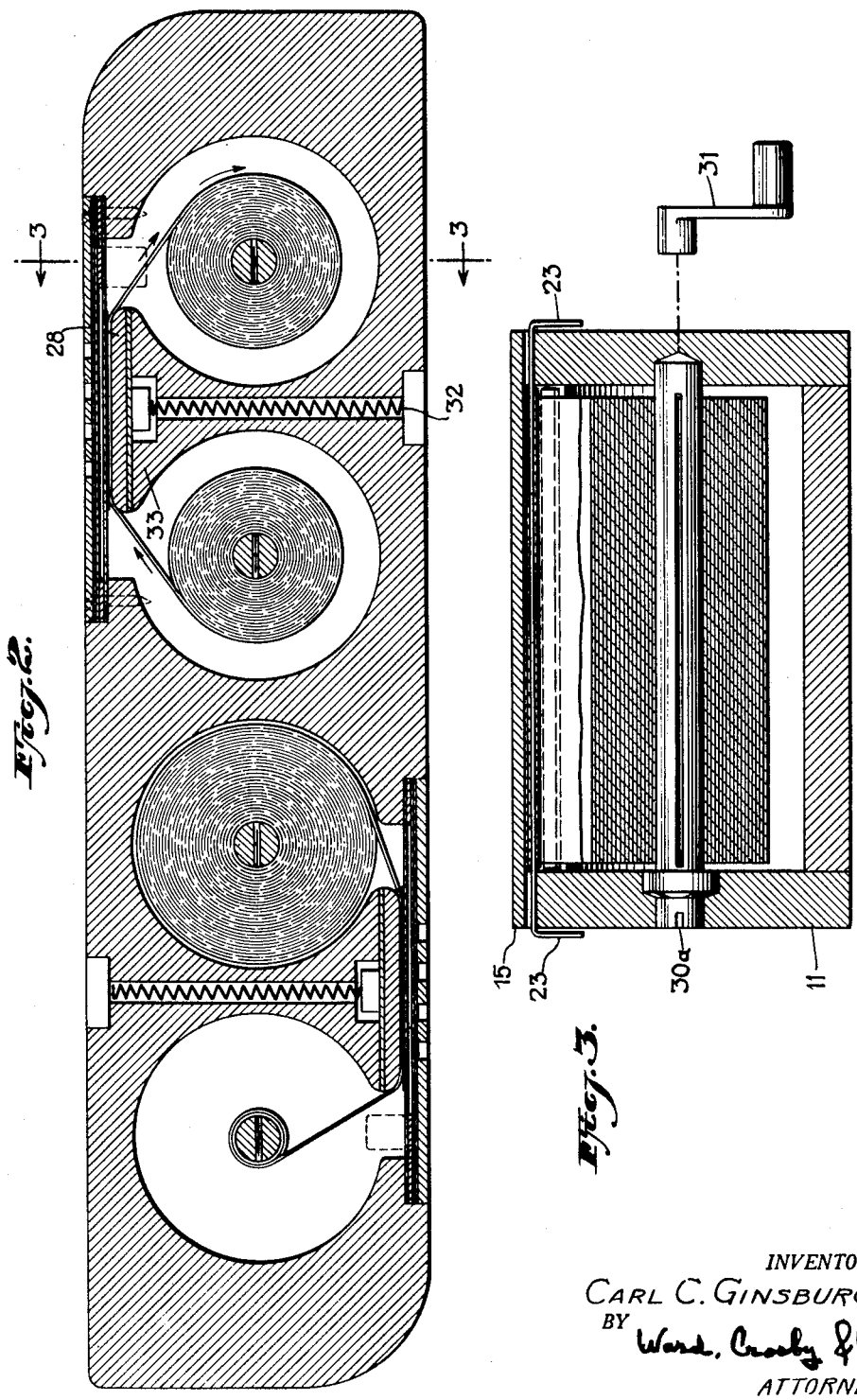
INVENTOR.
CARL C. GINSBURG.
BY
ATTORNEYS.

March 9, 1954 C. C. GINSBURG 2,671,677
DEVICE FOR CASTING SECRET BALLOTS
Filed Dec. 14, 1951 3 Sheets-Sheet 3
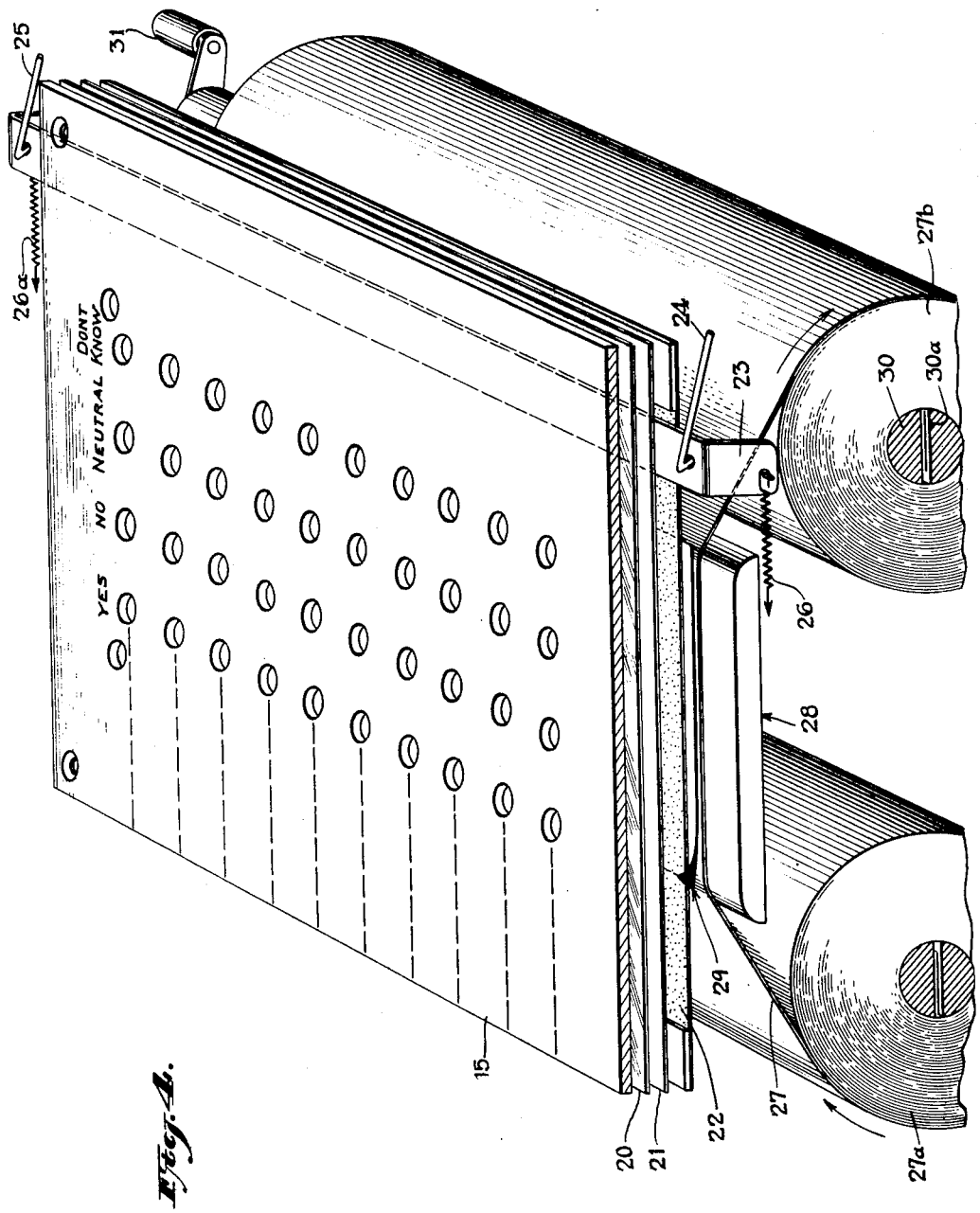
INVENTOR.
CARL C. GINSBURG.
BY Ward, Crosby & Neal
ATTORNEYS.

Patented Mar. 9, 1954

2,671,677

UNITED STATES PATENT OFFICE 2,671,677

DEVICE FOR CASTING SECRET BALLOTS

Carl C. Ginsburg, Staten Island, N. Y.

Application December 14, 1951, Serial No. 261,625

4 Claims. (Cl. 282—5)

This invention relates to voting apparatus, and more particularly to a device for casting a secret ballot and to a polling or vote recording device for making an anonymous record of votes with respect to one or a plurality of questions.

Apparatus of this type which have been suggested in the past have failed to provide simple and inexpensive means whereby a person can anonymously mark answers to one or a plurality of questions or express one or more preferences secretly and without psychological pressure from the person conducting the poll.

Also apparatus of this type heretofore proposed have been unduly complicated and expensive and have not been well adapted for easy movement to a place where a person may so secretly record personal preferences or answers to such questions.

Furthermore, voting apparatus of this general character heretofore suggested have failed to provide a device which can be marked to indicate a temporary or transient record of the voter's preference, such record being substantially instantaneously erasable by the voter by mechanical means, and also for simultaneously recording a permanent but anonymous indication of such preferences or answers to questions.

One of the objects of the present invention is to overcome the above difficulties or to reduce same to insignificance.

The invention, in one aspect thereof, comprises a member for supporting printed matter expressing the questions to be answered in the poll or, for example, the names of candidates, which support member is positioned side by side with respect to a flexible, thin, translucent or transparent primary sheet of oiled or waxed paper, silk, plastic or the like, which is semi-transparent, soft and pliable, and which, in combination with a marker sheet positioned face to face therewith and therebeneath, can, in response to stylus pressure, temporarily indicate the marking of the voter in response to said question on the adjacent support member. The marker sheet may be coated with a film of tacky or wax-like substance which will cause same to adhere to the plastic sheet to mark the track of the stylus in a well known manner, said tacky or wax-like film being different in color from that of said primary sheet. Means are provided for separating the primary and marker sheets to erase such stylus mark, which means are under the control of the voter and can be actuated immediately after he has marked his answers to such questions. Said marker and primary sheets, together with such erasing means, thus permit a transient indication of the voter's preferences. Said marker sheet is superimposed upon a sheet of duplicating material such as "carbon paper" or a film thereof which faces away therefrom toward a backing member which is positioned to permit the passage of a web of paper or the like sheet material to move therebetween, the carbon sheet in response to such stylus pressure being capable of transmitting a permanent mark to such web of paper, thereby providing an anonymous but permanent indication of the above-mentioned transient markings. Suitable means are provided for moving such web of paper whereby a fresh area thereof is presented after each voter has recorded his preferences in response to the questions involved in the poll.

If desired a protective sheet of transparent flexible material such as cellophane may be superimposed upon said primary sheet to prevent the latter from being torn by the stylus and to assist the sliding of the stylus. Such protective sheet is referred to as the stylus sheet. The protective sheet, primary and marker sheets may be employed as set forth in, for example, U. S. Patents 1,455,529 or 1,555,642.

Various further and more specific objects, features and advantages of the invention will clearly appear from the detailed description given below taken in connection with the accompanying drawings which form a part of this specification and illustrate, by way of example, preferred arrangements of apparatus for carrying out the invention. The invention consists in such novel combinations of features as may be shown and described in connection with the device herein disclosed.

In the drawings:

Fig. 1 is a perspective view of one form of apparatus embodying the invention;

Fig. 2 is a longitudinal sectional view of the apparatus shown in Fig. 1;

Fig. 3 is a transverse sectional view taken along line 3—3 of Fig. 2; and

Fig. 4 is a perspective schematic view, with parts shown in so-called "exploded" relationship, showing the portion of the invention wherein the stylus markings are recorded.

Referring to the drawings in further detail, the novel voting apparatus is generally indicated at 10 and is constituted by a housing 11 which, in the form shown, is of box-like configuration and which includes a top or support member 12 for supporting printed matter expressing the questions to be answered in the poll, as at (a), (b), (c), (d), etc. The support member 12 preferably covers only a portion of the top of the housing, that is, between 12a and 12b, the balance of the top of such housing between 12b and 13 comprising the marking area.

In the marking area, indicated generally at 14, there is provided a face plate 15 having a plurality of windows formed therein, the windows being arranged preferably in parallel columns, each column being indicated as at 16, 17, 18 and 19. These columns respectively may be suitably marked at the heading thereof to assist the voter to record his markings thereupon. For example, columns 16-19 have, in the form shown, marked at the tops thereof the following headings: "Yes," "No," "Neutral" and "Don't Know." The face plate 15 can be of any suitable sheet material and preferably is of sheet metal although it, of course, can be of sheet plastic or wood, etc. The function of the windowed face plate 15, of course, is to assist the voter in accurately placing his marks beneath the various headings. However, the invention is not limited to such a windowed face plate, it being possible to operate same without it, as will appear more fully hereinafter.

Referring now particularly to Fig. 4, the relative location of, and the various parts of the apparatus will now be described, wherein the transient or permanent markings are made. The above-mentioned face plate 15 is superimposed in face-to-face relationship upon a flexible thin sheet, hereinafter referred to as a stylus sheet and indicated generally at 20, which preferably is translucent or transparent and of a plastic substance. I have obtained satisfactory results with sheet 20 being composed of cellophane. The latter sheet is of sufficient flexibility and thinness to transmit therethrough the pressure of the point of a stylus onto a primary sheet 21 and a marker sheet 22 positioned in succession immediately therebeneath and also in face-to-face relationship therewith. The marker sheet has thereon, for example, a film composed of a wax or wax-like substance which preferably is of a dark color such as black. Said marker sheet is adapted for adhering to said primary sheet 21 in a well known manner to mark the track of a stylus as it moves thereover, the adherence therebetween producing a visible mark comprising such stylus track. The mark appearing as a result of such pressing together of the stylus, primary and marker sheets is of a transient nature and may be easily erased by merely separating said primary and marker sheets. Such separation can be accomplished manually by pulling the primary sheet away from the marker sheet or by means of an erasing bar, as at 23, which may be moved by hand between said sheets. If desired said bar may be held temporarily in the position shown in Fig. 4 by means of, for example, trigger fingers 24 and 25, against the pressure of a pair of springs attached to opposite extremities thereof and urging same across said sheets. One of said springs is shown, as at 26, attached to one extremity, the other spring at 26a. It is clear that by lifting the trigger fingers 24 and 25, the erasing bar 23 will immediately be urged between the primary and marker sheets thereby separating same and erasing any mark which may have been made by marking in the windows of the columns 16-19, inclusive.

In order to provide a permanent record of the markings of each voter, a paper web, as at 27, is positioned beneath the above-described sheets and interposed between a relatively rigid backing member 28 and a carbon sheet 29 which, in the form shown, is secured to the back of sheet 22 and which, of course, faces away therefrom whereby the pigment-bearing surface of the carbon sheet is presented to the web 27. The term "carbon sheet" as employed herein embraces within its purview any pigmented surface adapted to transmit a mark as a result of stylus pressure thereupon, the most common example comprising carbon paper employed in typewriters. The sheets 20, 21 and 22 and the carbon sheet 29 are sufficiently thin to insure the transmission of the stylus marking therethrough onto said web 27.

The web 27 preferably is wound in the form of a roll, as at 27a, which may be unwound as it is reeled upon a suitable spindle, as at 30, thereby forming a roll, as at 27b. The spindle 30 may be actuated by hand, for example, by means of a handcrank, as at 31, which may be operatively associated therewith through any suitable means. Of course, if desired, the handcrank 31 may be demountable from the apparatus and the spindle 30 may be actuated by turning a slotted extremity 30a.

As is well shown in Fig. 2, the relatively rigid backing member 28 may be resiliently urged upwardly, as viewed in this figure, by means of a spring, as at 32. The backing member 28, as shown in this figure, is provided therebeneath with a pedestal, as at 33, which is substantially coextensive therewith and which in turn provides support therefor.

In operation, a voter is tendered the entire apparatus 10 (Fig. 1) with printed matter upon the member 12, for example containing questions (a), (b), (c) and (d), etc., which can be answered properly by a stylus marking under any one of the headings for the columns 16-19, inclusive. The voter can carry the apparatus to a suitable private place where he may make such markings in the above-described windows of the face plate by means of a stylus, such markings being visible to him. Prior to the making of such markings the erasing bar 23 is moved to its "cocked" position as in Fig. 4. Thus the erasing bar is moved to one side so as not to interfere with the stylus markings. The stylus pressure, of course, causes the above-described adherence between said primary and marker sheets, and also effects a permanent marking upon the web 27 which, of course, is held stationary during the voting. After the voter has completed his markings, he may release the triggers 24 and 25 thereby causing the erasing bar 27 to move rapidly between the primary and marker sheets thereby erasing the transient marks previously visible thereupon, but not effecting the permanent record made upon the web 27. The voter then returns the apparatus, for example to the person conducting the poll, who may angularly shift the spindle 30 to present a fresh surface beneath said windows for the next voter.

Thus the person conducting the poll has no visible indication of the manner in which the voter has answered the questions. The apparatus can then be presented to the next voter.

While the invention has been described with respect to certain preferred examples which have given satisfactory results, it will be understood by those skilled in the art after understanding the invention that various changes and modifications may be made without departing from the spirit and scope of the invention, and it is intended therefor in the appended claims to cover all such changes and modifications.

What is claimed as new and is desired to be secured by Letters Patent is:

1. In apparatus of the class described, a flexible, transparent stylus sheet having associated therewith means for delineating thereon a plurality of separate adjacent columns, a member positioned adjacent said sheet and for supporting indicia, a primary sheet, a wax coated marker sheet positioned next adjacent said primary sheet for adhering thereto in response to pressure exerted on the stylus sheet whereby a mark is made to appear on such sheet by such adherence, a carbon sheet positioned next adjacent said marker sheet on the side thereof opposite to said primary sheet, a backing surface member for supporting said sheets, said backing surface member being positioned relative to said carbon sheet to permit the passage of a web, the latter to bear marks thereupon as a result of stylus pressure on said stylus sheet, and means for separating said primary and marker sheets for erasing any marks upon the former.

2. A poll taking device including in combination: a member for supporting printed matter expressing the questions of the poll, a flexible, thin, transparent stylus sheet positioned adjacent such member, a primary and a marker sheet mounted in succession next adjacent said stylus sheet, said primary and marker sheets being adherable to one another in response to stylus pressure to produce a visible mark in response to such stylus pressure forcing said sheets together, a carbon sheet positioned next adjacent said marker sheet with the carbon face thereof facing away from said marker sheet, a backing surface member positioned for allowing passage between it and said carbon sheet of a web of paper to record marks similar to those on said stylus sheet resulting from such stylus pressure, means for supporting unwinding and winding rolls of such web, means for advancing said web through a preselected increment, and means for separating the adhered portions of said marker and primary sheets.

3. In a poll taking device, a backing member, a carbon sheet positioned facing said backing member for permitting passage therebetween of a web of paper or the like, a marker sheet positioned next adjacent to and facing away from said carbon sheet, a thin, flexible primary sheet positioned in contact with said marker sheet and capable of adhering thereto in areas pressed thereagainst as by a stylus to produce a visible mark which is erasable in response to separation of said primary and marker sheets.

4. In a voting device, a primary sheet, a marker sheet juxtaposed thereagainst in face to face relationship, a carbon sheet juxtaposed beneath said marker sheet, a backing member positioned beneath said carbon sheet for allowing the passage therebetween of a web of paper to record marks thereupon in response to stylus pressure upon such primary sheet, means for advancing said web, and means for separating said marker and primary sheets.

CARL C. GINSBURG.

References Cited in the file of this patent

UNITED STATES PATENTS

| Number | Name | Date |
| --- | --- | --- |
| 1,187,832 | Hart | June 20, 1916 |
| 1,568,548 | Edelson | Jan. 5, 1926 |
| 1,729,916 | Vernon | Oct. 1, 1929 |